(12) United States Patent
Heininger

(10) Patent No.: US 8,985,415 B2
(45) Date of Patent: Mar. 24, 2015

(54) BED RACK

(71) Applicant: Heininger Holdings, LLC, Bellingham, WA (US)

(72) Inventor: Jeffrey Heininger, Bellingham, WA (US)

(73) Assignee: Heininger Holdings, LLC, Bellingham, WA (US)

( * ) Notice: Subject to any disclaimer, the term of this patent is extended or adjusted under 35 U.S.C. 154(b) by 77 days.

(21) Appl. No.: 13/865,409

(22) Filed: Apr. 18, 2013

(65) Prior Publication Data

US 2013/0277404 A1 Oct. 24, 2013

Related U.S. Application Data

(60) Provisional application No. 61/635,090, filed on Apr. 18, 2012.

(51) Int. Cl.
*B60R 9/10* (2006.01)
*B60P 3/07* (2006.01)

(52) U.S. Cl.
CPC ... *B60R 9/10* (2013.01); *B60P 3/07* (2013.01); *Y10S 224/924* (2013.01)
USPC .......................................... 224/403; 224/924

(58) Field of Classification Search
CPC .............. B60R 9/10; B62H 3/08; B62H 3/04; B62H 3/06
USPC ................. 224/402, 403, 924; D12/407, 408; 211/17–22
See application file for complete search history.

(56) References Cited

U.S. PATENT DOCUMENTS

| | | | | |
|---|---|---|---|---|
| 556,789 | A * | 3/1896 | Walker | 211/20 |
| 3,912,139 | A * | 10/1975 | Bowman | 410/3 |
| 5,603,439 | A * | 2/1997 | Pineda | 224/403 |
| 7,051,909 | B2 * | 5/2006 | Gibson | 224/403 |
| 2006/0273126 | A1 * | 12/2006 | Pedrini | 224/536 |
| 2009/0236382 | A1 * | 9/2009 | Sautter et al. | 224/497 |

OTHER PUBLICATIONS

Autoanything; Advantage SportsRack Truck Bed Bike Rack; http://www.autoanything.com/bike-racks/69A5018A0A0.aspx; Aug. 9, 2013; 1 page.
Autoanything; INNO Velo Gripper Truck Bed Bike Rack; http://www.autoanything.com/bike-racks/69A5457A0A0.aspx; Aug. 9, 2013; 1 Page.
Autoanything; Thule Insta-gater Truck Bed Bike Rack; http://www.autoanything.com/bike-racks/65A5486A0A0.aspx; Aug. 9, 2013; 1 Page.
Autoanything; Tail-Gator Truck Tailgate Bike Rack; http://www.autoanything.com/bike-racks/69A5581A0A0.aspx; Aug. 9, 2013; 1 Page.
Autoanything; Thule Bed Rider Truck Bike Rack; http://www.autoanything.com/bike-racks/69A3107A0A0.aspx; Aug. 9, 2013; 1 Page.

(Continued)

*Primary Examiner* — Adam Waggenspack
(74) *Attorney, Agent, or Firm* — Lowe Graham Jones PLLC

(57) ABSTRACT

A rack for holding a wheeled vehicle within the bed of a pickup truck includes a frame and an upper arm and a lower arm attached to the frame. The upper and lower arms are movable with respect to one another to allow a wheel of the bicycle or other vehicle to be inserted or removed from the arms. The frame may be adjustable to snugly retain it within the bed of a vehicle.

12 Claims, 4 Drawing Sheets

(56) References Cited

OTHER PUBLICATIONS

Autoanything; Yakima BeddyJo Bike Rack; http://www.autoanything.com/bike-racks/69A4023A0A0.aspx; Aug. 9, 2013; 1 Page.

Autoanything; RockyMounts Clutch SD Truck Bed Bike Rack; http://www.autoanything.com/bike-racks/69A6248A0A0.aspx; Aug. 12, 2013; 1 Page.

Autoanything; Swagman Truck Pick-Up Fork Mount Bike Rack; http://www.autoanything.com/bike-racks/swagman-truck-pick-up-fork-mount-bike-rack; Aug. 12, 2013; 1 Page.

* cited by examiner

BED RACK

PRIORITY CLAIM

This application claims the benefit of provisional application No. 61/635,090 filed Apr. 18, 2012, the contents of which are incorporated by reference.

FIELD OF THE INVENTION

The present invention relates generally to a support frame for use in the bed of a truck for equipment such as bicycles.

BACKGROUND OF THE INVENTION

The bed of a pickup provides ample space for transporting bicycles, but not in an efficient manner that allows the bicycles to remain upright for easy removal and in a way that avoids damage. Others have sought solutions to this problem, generally through the installation of a bike rack into the bed of the pickup in which the bike rack is of the type having a slotted arrangement to receive the wheels of a bicycle within a slot defined by two parallel bars. Racks of this type tend to be heavier than necessary, take up a lot of space, and do not hold the bicycle in place rigidly enough during travel. The slotted approach also does not provide the same grip for a wide range of bicycles of different sizes. While the bed-mounted bike rack is an improvement over transporting the bikes in the open bed of the pickup, current bike racks have many deficiencies.

SUMMARY OF THE INVENTION

The present invention is directed generally to a rack for use with an object such as a bicycle. The rack preferably includes a frame configured to be secured in place in the bed of a pick-up truck or another suitable location.

In a preferred example, the rack includes one or more lower arms and one or more corresponding upper arms, each of which extends from the frame. At least one of the arms is pivotally mounted to the frame, and in a preferred example at least the upper arm is attached for pivotal movement toward and away from the lower arm.

The arms also preferably include a cup at the end of each arm. In the preferred example the cups form a channel along a segment of an arc, thereby being configured to receive a tire of a bicycle, motorcycle, or other wheeled vehicle between the upper arm and lower arm to secure the vehicle to the rack. The arms and/or the cups can be resiliently mounted to secure the vehicle in place without using a clip, clamp, or a lock, although for added security such components may be used.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
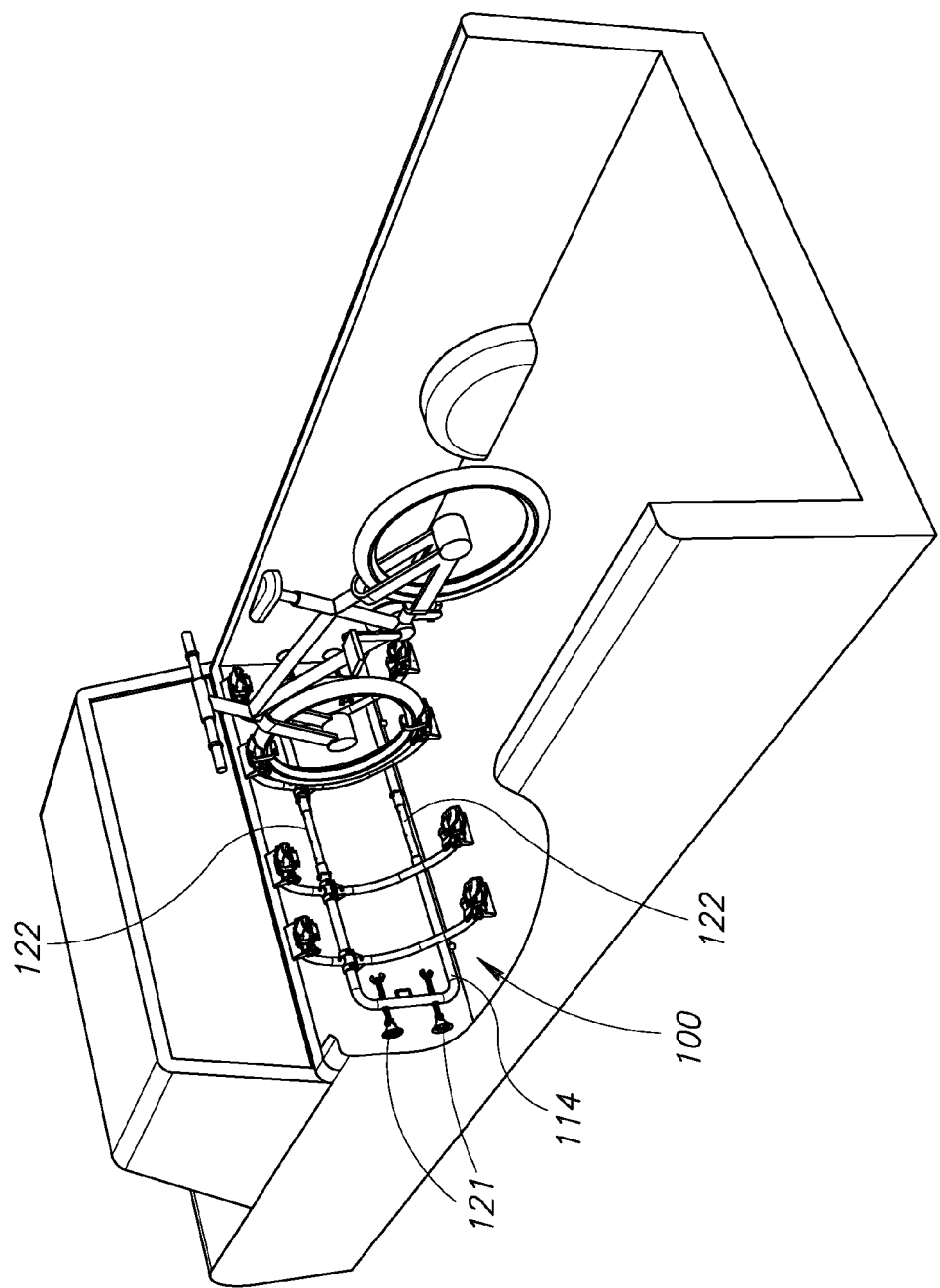
FIG. 1 illustrates a bike rack configured in accordance with the present invention, shown in position in the back of a pickup and supporting a bicycle.
Figure 2:
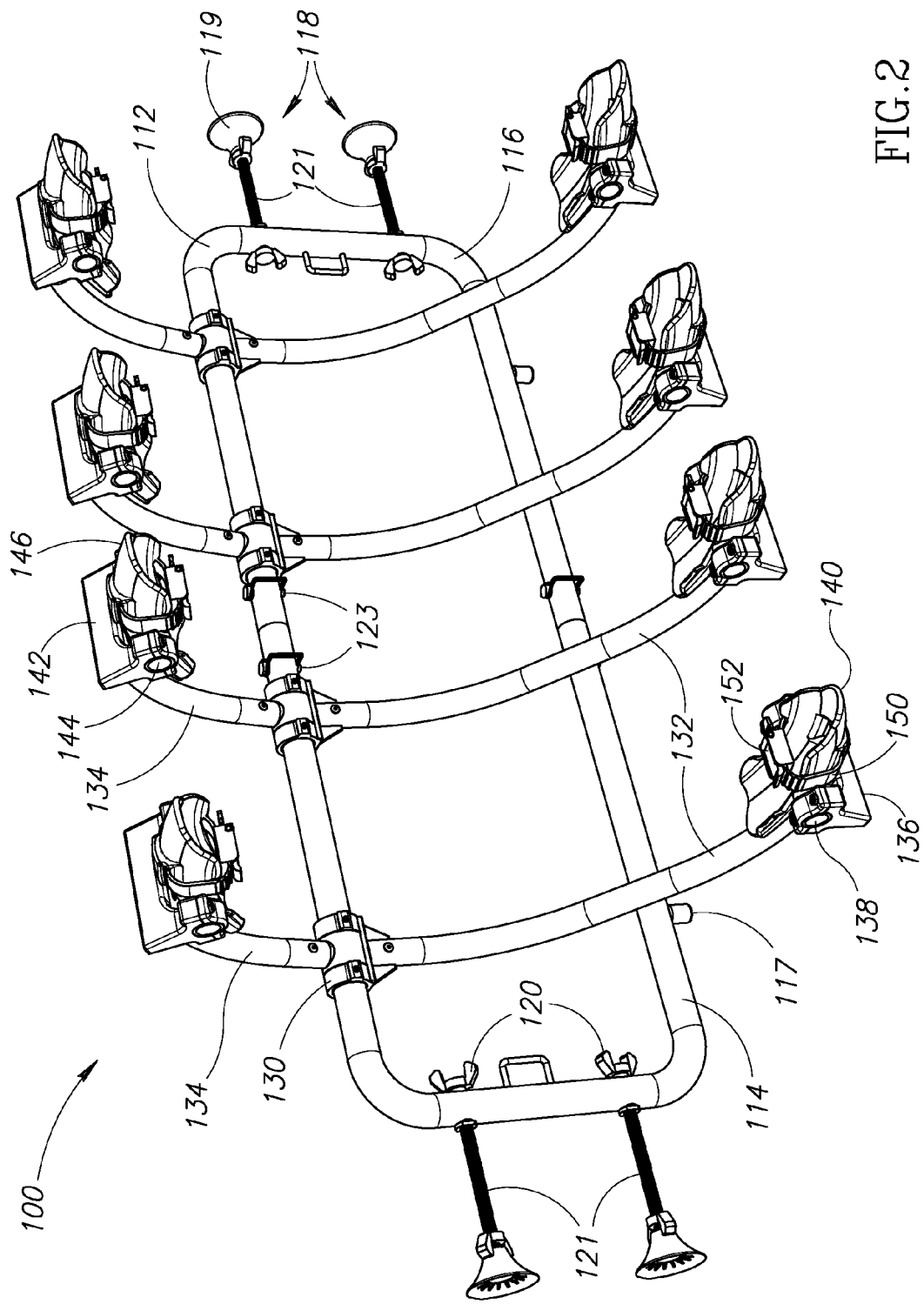
FIG. 2 is a perspective view of a preferred bike rack.

The Figures depict a rack 100 configured in accordance with a preferred version of the present invention. The rack 100 can be configured to hold bicycles, motorbikes, or any other suitable wheeled vehicle. In other embodiments, the rack 100 can be configured to secure to virtually any object. Once assembled, the rack 100 can be secured in the back of a pick-up truck or in another convenient location. As best seen in FIG. 1, a preferred bike rack is shown in position within a bed of a pickup, with the pickup partially illustrated in a representative fashion and without tires and other details not relevant to the present invention.

Figure 3:
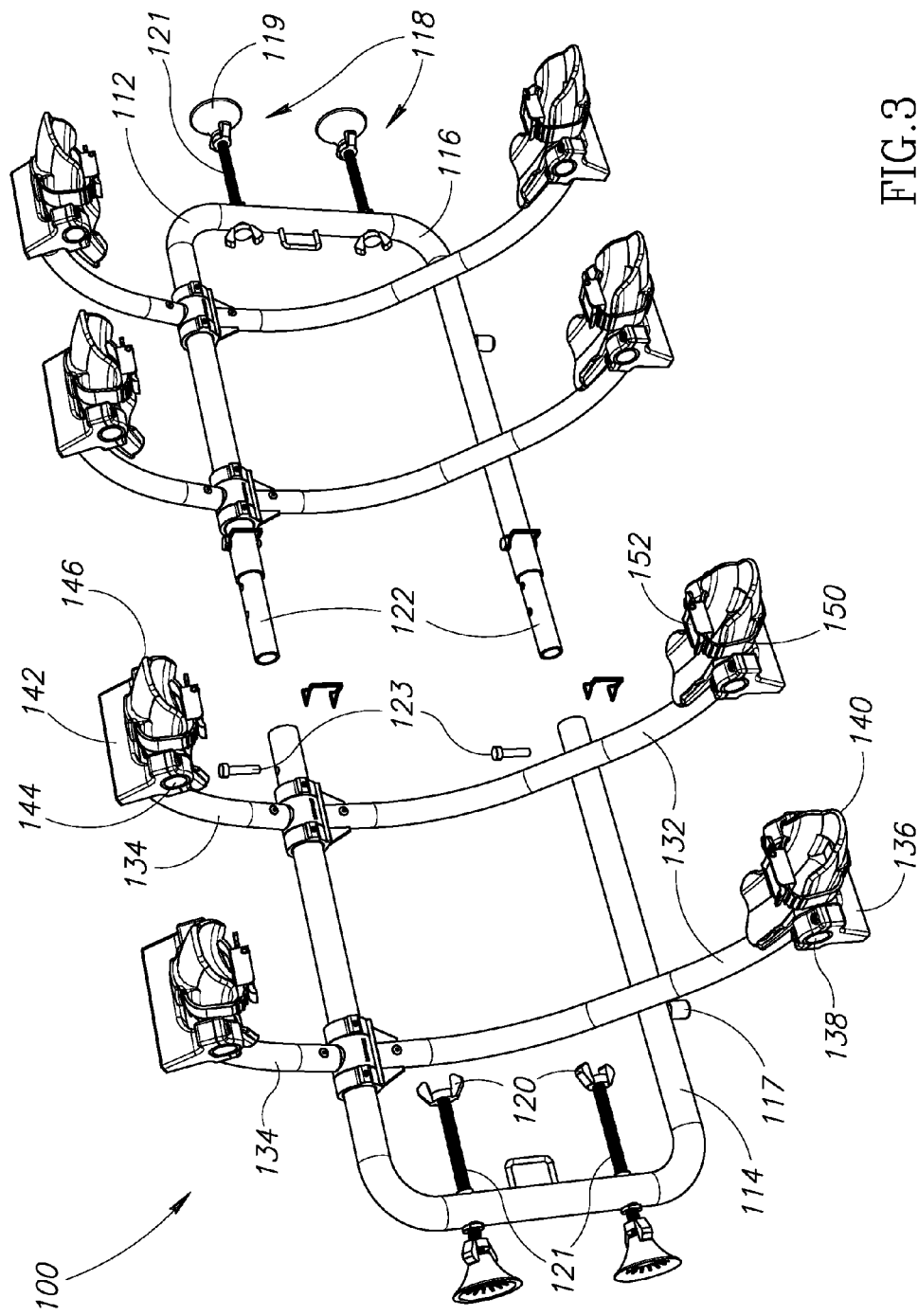
FIG. 3 is a partial exploded view of a preferred bike rack.
Figure 4:
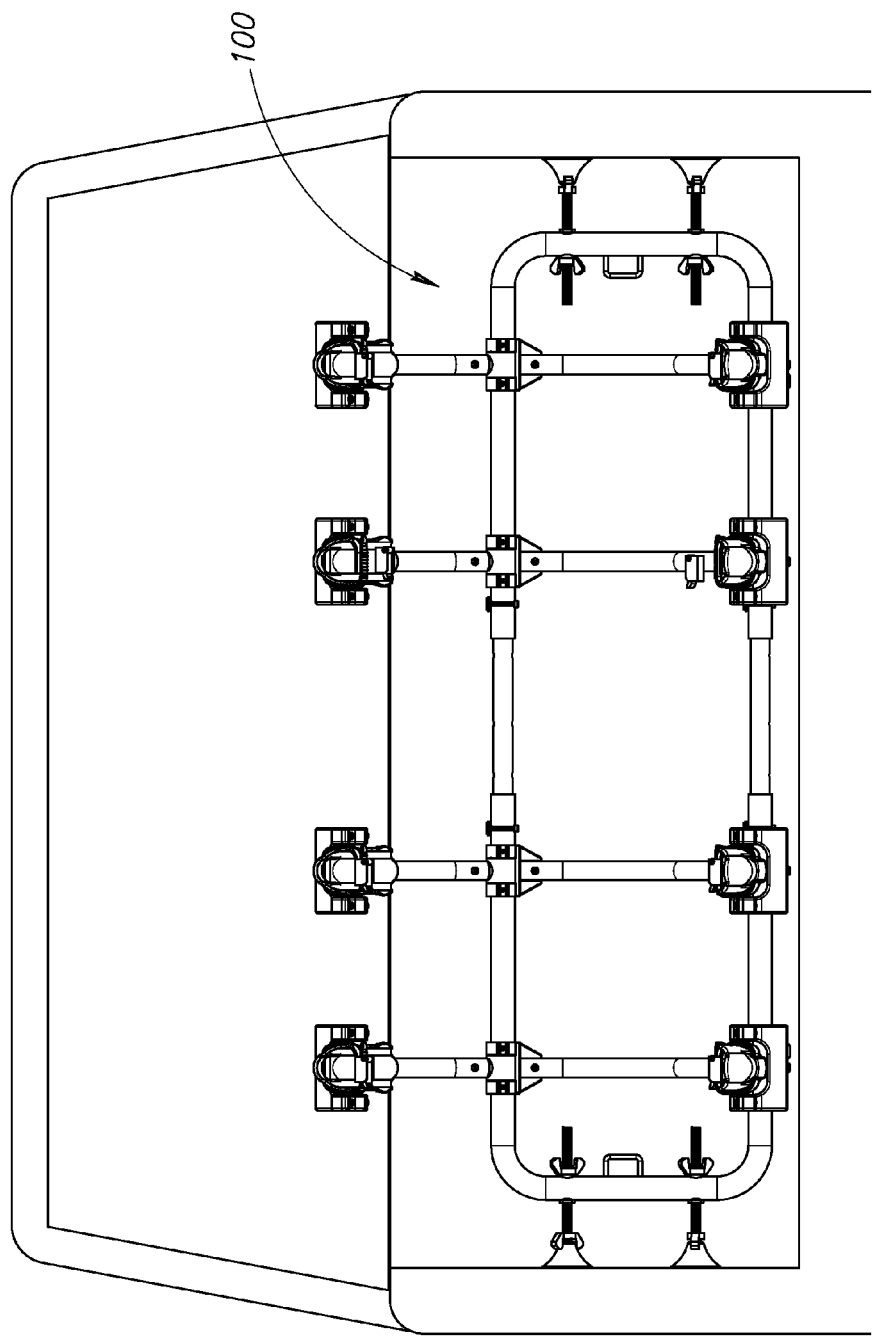
FIG. 4 is an elevational view of the bike rack of FIG. 1.

The rack 100 includes a frame 112 configured to provide stable support for the rack within the bed of a pickup. The frame may take a variety of shapes, but in a preferred version the frame is generally rectangular in shape. As illustrated, the frame is formed from tubular members and incorporates rounded elbows at the corners, therefore having a rounded rectangular shape, having a left side, a right side, a top side, and a bottom side. The frame is made to be adjustable in order to accommodate a range of bed sizes, and in order to facilitate the adjustability the frame is formed with a first frame member 114 and a second frame member 116, each of the frame members 114, 116 being generally similar U-shaped members joined together by a coupler 122, as best seen in FIG. 3.

In one version, the first frame member 114 is coupled to the second frame member 116 by a telescoping coupler 122 which can be inserted into each of the first frame member 114 and the second frame member 116. Although the coupler 122 is illustrated as being smaller and received within the frame members, the coupler may be larger so that it surrounds the frame members rather than being received within the frame members. With the use of the coupler, the length of the frame 112 can be adjustable to suit a wide range of pick-up truck beds or any other locations where the frame might be mounted. In some embodiments, multiple telescoping couplers 122 can be used in series to form a larger and more adjustable frame 112. Likewise, in some versions the telescoping coupler may be omitted and the frame may be formed in a fixed configuration.

While it is useful to provide a degree of adjustability through the use of the telescoping coupler, it is also valuable to be able to secure the frame members and the coupler in a fixed position as desired. In one version, the telescoping couplers 122 can be secured to the frame members 114, 116 by a pin and clip system that passes through a hole or recess in the frame members 114, 116. As illustrated, a pin 123 extends through holes formed in the frame member 114 and the coupler 122 to hold them together in a fixed position. In such a version, the coupler 122 (or the frame member, or both) may include any number of holes that are spaced apart from one another to provide discrete locations for the pin 123 to join the two components together. Instead of the pin, the frame members 114, 116 can include a detent that engages a hole or a slot to hold the frame members 114, 116 in position relative to one another. In other embodiments, the frame members 114, 116 can be coupled together using other fastening means such as a clamp or a friction fit so the frame 112 can be continuously adjustable.

While the preferred example is described and illustrated as having a pair of U-shaped frame members and a central coupler, the frame may also be adjustable by forming one of the frame members such that it is telescopically received by the other frame members, thereby eliminating the coupler. In such a version, one of the frame members may fit within the other, or may be configured to nest with or slide over or under the other frame member to allow for adjustability.

The frame 112 is ideally suited to be positioned in the bed of a pick-up truck with the frame 112 against the front lower wall of the bed of the truck, just under the rear window of the cab. The frame 112 can alternatively be positioned against the tailgate or against one of the sides of the truck, or in another suitable location. As noted above, the frame may be expanded or contracted as desired in order to fit within the bed of the pickup. Alternatively, the frame may be custom-sized to fit within a particular pickup bed, thereby avoiding the need for any adjustment in the size of the frame.

The frame 112 can be secured to the truck bed by laterally-extending engagement members 118. In general, the engagement members are configured to be able to extend or retract laterally in order to wedge the frame within the pickup bed or to release the frame so that it can be removed. In one version, the engagement members include a threaded rod 121, a cone 119, and wing nuts 120. The threaded rod 121 extends through a bore in the frame or is otherwise attached to one of the frame members. The bore may be threaded in some versions, while in other versions the bore may not be threaded and the rod may be frictionally held to the frame through the use of nuts or the like. The cone 119 is provided at one end of the rod in order to engage the wall of the truck bed or other surface. A cone is preferred, and provides a degree of resiliency in order to improve the frictional fit of the frame within the truck while avoiding scratches. In other versions however, the rod may terminate in any surface that is capable of engaging a sidewall of a pickup in order to firmly hold the frame in position. In the illustrated version, wing nuts 120 are provided to adjustably secure the frame 112 to the truck bed. In combination, the engagement members are laterally adjustable to move from a first position in which the engagement members are snugly pressed against the sidewalls of the bed of the truck, and a second position in which the engagement members are retracted inward away from the bed of the truck to allow the rack to be removed. As shown, four engagement members are provided in a preferred version, with two positioned within each U-shaped frame member.

The frame may optionally include one or more feet 117 positioned along a bottom portion of the frame to provide support for the frame above the floor of the pickup bed. In some versions the feet are formed from a resilient material to reduce the likelihood of scratches that may be caused if the frame rubs against the floor of a pickup bed.

The frame further includes one or more arm mounts 130 attached to the frame to provide locations for attachment of arms for engaging a wheel of a bicycle. In a preferred version, the arm mount 130 is attached to the upper portion of the frame; that is, the top side of the rectangle when the frame is formed in a generally rectangular shape as illustrated. The arm mounts are configured to be laterally positionable on the frame, allowing the arm mounts to move toward one side or the other of the frame (and therefore one side or the other of the bed of the pickup). In one version, the frame is formed from tubular members and the frame mounts are sized and shaped to engage the outer surface of the tubular frame member in a fashion that allows the arm mount to slide along the tubular member. Screws or clamps on the arm mounts allow the arm mounts to be fixed in a desired location.

In general, the rack 100 includes a pair of arms (an upper arm and a lower arm) carried on the frame in a manner that allows at least one of the arms to move relative to the other. In some versions both arms may pivot toward or away from each other, while in other versions only one of the arms is pivotally movable.

As illustrated, the arm mount includes a lower portion that receives a lower arm 132. The lower arm is mounted in a fixed position to the arm mount, although the arm mount may itself be pivotally and slideably mounted to the frame. The lower arm 132 extends downwardly and outwardly from the frame, eventually including a lower portion that is configured to rest on the floor of the pickup bed. The lower arm 132 can be curved or rounded to generally mimic or at least accommodate the shape of a wheel of a bicycle or other vehicle to be secured to the rack 100. The lower arm 132 can have a different shape to accommodate another object. For example, the lower arm 132 can have a square shape that accommodates a crate or a package or another similar article.

The rack 100 also includes one or more upper arms 134 coupled to the arm mount 130 and generally opposing the lower arm 132. The upper arm 134 extends from the arm mount 130 upwardly and outwardly, and cooperates with the lower arm 132 to mimic or at least accommodate the shape of a wheel to secure the arms to the wheel. The arms 132, 134 can be shaped differently as needed to accommodate other objects. The arm mount 130 is formed to permit the upper arm 134 to rotate relative to the frame 112. Thus, in one version the arm mount is formed with a tubular T-shape, in which the vertical portion of the T provides a surface for attachment of the upper arm 134. The horizontal portion of the T is formed as a tubular member that surrounds the upper tubular portion of the frame while being slideably and pivotally retained within the arm mount by a pair of opposing clamps. The clamps are adjustable to both hold the upper arm in a fixed position and to hold the arm mount in a fixed location along the frame. This configuration of the arm mount allows the upper and lower arms to move toward and away from one another, and to be clamped into a desired position.

In some versions, the upper arm 134 can rotate upward, but is prevented from rotating downward beyond a desired limit by configuring the arm mount with a stop that engages the upper arm to limit its path of travel. A similar stop may be provided on the opposite side to limit upward travel, if desired. In still other embodiments, the upper arm 134 can freely rotate both upwardly and downwardly. In yet other embodiments, the upper arm 134 does not rotate relative to the frame 112 and the arm mount 130 may be formed as a fixed joint. The rack 100 can include any desired number of arm mounts with associated lower arms 132 and upper arms 134. In the illustrated version, four such mounts are shown.

The lower arm 132 preferably includes a brace 136 coupled to the end of the lower arm 132. The brace provides a lower surface for the lower arm to engage the bed of the truck, and is preferably formed from a material that will not scratch the paint of the bed. The brace further provides stable lateral support for a bicycle carried within the arms, and in order to provide stable support the brace extends laterally to each side of the lower arm to resist rotational forces of the bicycle against the arms. In a preferred version, the brace extends at least two inches on each side of the arm, and therefore has an overall width of at least four inches.

The brace 136 further provides a mechanism for attachment of a bicycle wheel to the lower arm, and in one version the brace includes a pivotable joint 138 attached to a cup 140. The cup 140 can be shaped to receive a portion of a tire of a bicycle, and preferably forms an arc segment with an interior channel. In some embodiments, the cups 140, 146 are positioned to engage a tire of a bicycle at diametrically opposite positions. The pivotable joint 138 can permit the cup 140 to rotate at least slightly relative to the brace 136 to mount and dismount the bicycle from the rack 100.

The upper arm 134 may be formed with a similar brace 142, pivotable joint 144, and cup 146 coupled to the end of the upper arm 134. In some embodiments, the lower brace 136 can be slidably mounted to the lower arm 134 so that lower brace may be moved along the length of the lower arm, and therefore allowing adjustment of the position of the cup 140 relative to the wheel or other mounted object can be adjusted. The upper brace 142 can be similarly adjustable. In other embodiments, the braces 136, 142 are fixed to the end of the arms 132, 134.

The components of the frame 112, the lower arms 132, the upper arms 134, and the components of the braces 136, 142 and the cups 140, 144 can be made from lightweight, durable materials, preferably including plastics or metals such as die cast aluminum. They can be made using injection-molding or another suitable manufacturing technique. Some of the components can be made of metal carbon fiber or another suitable material.

The rack 100 can be mounted to the bed of a truck and can be configured for use with one or more bicycles. In use, the frame is positioned within the bed of a pickup and the engagement members are adjusted outward to the extent necessary to firmly wedge the frame within the bed of the pickup. The lower arms 132 and upper arms 134 are then positioned apart from one another sufficiently to permit a tire of a bicycle to be received between the arms. In most instances, this means rotating the upper arm upward and outward away from the lower arm. A wheel of a bicycle is then seated in the cup 140 of the lower arm. Once in position in the lower cup, the upper arm is rotated toward the lower arm so that the bicycle wheel is snugly received between the two arms. In some versions of the invention, the upper arm may then be tightened into position by tightening the clamps of the arm mount.

In alternate versions, the arm mount allows the upper and lower arms to freely pivot toward or away from one another, without tightening the upper arm into a particular position to accommodate a given wheel size. In such a version (and, optionally with other versions of the invention) a strap 150 is provided together with the braces or the upper and lower arms to attach the wheel to the upper and lower arms. The strap preferably joins to the brace, the arm, or the cup to provide a length of strap that can encircle a portion of the tire and rim of the wheel that rests in the cup. A buckle 152 is provided on one end of the strap to allow the opposite end of the strap to be joined to firmly hold the wheel within the cup. Other forms of belts, clips, or such structures are also possible to hold the wheel within the cup. The upper arm also includes a strap or the like to attach the wheel to the cup. With the use of the strap, the upper arm need not be tightened into a particular position because the weight of the wheel will naturally hold both arms in position about the wheel, with only a relatively small amount of play being possible. In a version in which the lower arm is fixed and only the upper arm rotates, the use of the straps will hold both arms in a fixed or substantially fixed position with respect to the frame.

In some versions, the arm mount 130 can be spring-loaded to exert sufficient force to urge the arms toward one another and thereby exert a force on the tire to maintain the tire in place relative to the rack 100. The arms 132, 134 can be permitted to resiliently move away from one another, such as when the bicycle tire is pressed between the arms 132, 134.

In other embodiments, the arms 132, 134 can be releasably pivoted such as with a quick release mechanism that can be released by a user to loosen the otherwise fixed and tightened connection of either of the arms 132, 134 at the arm mount 130 in order to open the arms 132, 134 to mount a bicycle to the rack 100. With a bicycle in place between the arms, the quick connect can be closed when the arms 132, 134 are properly mounted against the bicycle's tire. Most preferably, the user is able to pivotally move the arms 132, 134 toward one another in order to snugly receive and retain the bicycle tire within the arms.

While the preferred embodiment of the invention has been illustrated and described, as noted above, many changes can be made without departing from the spirit and scope of the invention. For example, the arms and cups can have a different shape that mimics or at least accommodates some object other than the wheel of a bicycle. Also, the arms can be secured resiliently using a spring or other biasing member, or can be secured using a mechanical clamp or another type of fastener. In addition, the arms can have more than one set of cups attached to the end of the arms such that a single pair of arms can hold more than on bicycle. Accordingly, the scope of the invention is not limited by the disclosure of the preferred embodiment. Instead, the invention should be determined entirely by reference to the examples that follow.

The embodiments of the invention in which an exclusive property or privilege is claimed are defined as follows:

1. A device for holding a wheeled vehicle within the bed of a pickup, comprising:
    a frame configured to be carried by the bed, the frame being formed by a left U-shaped member and a right U-shaped member attached to form a rectangular frame having a top side, a bottom side, a left side, and a right side;
    a lower arm attached to the frame;
    an opposing upper arm attached to the frame, the upper arm being pivotally movable toward and away from the lower arm;
    a first cup attached to the lower arm;
    a second cup attached to the upper arm;
    at least one strap carried by the lower arm or the upper arm, the strap being configured to attach the wheel to the lower arm or the upper arm; and
    an arm mount carried by the frame and configured to attach the lower arm and the upper arm to the frame, the arm mount being attached to the top side of the frame;
    whereby a wheel of the wheeled vehicle is removably retainable by the first cup and the second cup when the upper arm is pivoted toward the lower arm to retain the wheel.

2. The device of claim 1, wherein the arm mount further comprises a releasable fastener attaching the arm mount to the frame, whereby the arm mount is selectively movable along the frame or fixed in position with respect to the frame by operation of the releasable fastener.

3. The device of claim 2, wherein the lower arm is in a fixed position on the arm mount.

4. The device of claim 1, wherein the left U-shaped member and right U-shaped member are movable toward or apart from one another, whereby the frame is adjustable in size.

5. The device of claim 4, further comprising a coupler joining the left U-shaped member to the right U-shaped member.

6. The device of claim 1, further comprising an engagement member attached to the frame and extending laterally from the frame, the engagement member being positioned to engage a sidewall of the bed to hold the frame within the bed.

7. The device of claim 6, wherein the engagement member is laterally adjustable to selectively retain the frame within the bed or release the frame from the bed.

8. The device of claim 1, further comprising a fastener attached to the arm mount and positioned to retain the upper arm in a fixed pivotal position.

9. A device for holding a wheeled vehicle within the bed of a pickup, comprising:
    a frame configured to be carried by the bed;
    a lower arm attached to the frame;

an opposing upper arm attached to the frame, the upper arm being pivotally movable toward and away from the lower arm;

a first cup attached to the lower arm;

a second cup attached to the upper arm;

at least one strap carried by the lower arm or the upper arm, the strap being configured to attach the wheel to the lower arm or the upper arm;

an arm mount carried by the frame and configured to attach the lower arm and the upper arm to the frame; and a brace attached to the lower arm, the brace having a lower side configured to rest on the bed, the first cup further being attached to the brace;

whereby a wheel of the wheeled vehicle is removably retainable by the first cup and the second cup when the upper arm is pivoted toward the lower arm to retain the wheel.

10. The device of claim 9, wherein the first cup is pivotally attached to the brace.

11. The device of claim 10, wherein the strap is attached to the first cup.

12. The device of claim 9, wherein the first cup is formed as a segment of an arc and comprises a channel for receiving the wheel.

* * * * *